United States Patent
Ritzmann et al.

[11] 4,083,676
[45] Apr. 11, 1978

[54] METHOD FOR HEAT TREATING FINE-GRAIN MATERIAL

[75] Inventors: Horst Ritzmann, Enniger; Heinz Thiemeyer, Neubeckum; Georg Schepers, Ennigerloh; Wolf Goldmann, Neubeckum, all of Germany

[73] Assignee: Polysius AG, Neubeckum, Germany

[21] Appl. No.: 731,527

[22] Filed: Oct. 12, 1976

[30] Foreign Application Priority Data
Oct. 14, 1975 Germany .......................... 2545933

[51] Int. Cl.² .................. F27B 15/00; F27B 7/02
[52] U.S. Cl. ........................... 432/14; 432/106; 106/100
[58] Field of Search .............. 432/15, 14, 58, 105, 432/106; 106/100

[56] References Cited
U.S. PATENT DOCUMENTS 3,986,818  10/1976  Deussner et al. ............... 432/106
4,002,420  1/1977   Christiansen ................... 432/106
4,004,876  1/1977   Sylvest ........................ 432/106

FOREIGN PATENT DOCUMENTS
1,043,921  11/1958  Germany ....................... 432/106

Primary Examiner—John J. Camby
Assistant Examiner—Henry C. Yuen
Attorney, Agent, or Firm—Learman & McCulloch

[57] ABSTRACT

Fine grained material such as raw cement meal is preheated in a preheater and discharged from the latter into a rotary kiln for calcining and through which hot exhaust gases pass in counterflow to the material. Immediately after introduction of the material to the kiln fuel is sprayed onto the surface of the material and is covered either by additional material from the preheater or by circulation of the material already in the kiln, due to rotation of the kiln at an elevated speed. The fuel is combusted virtually entirely within the kiln and substantially directly at the material without previous gasification of the fuel.

8 Claims, 3 Drawing Figures

METHOD FOR HEAT TREATING FINE-GRAIN MATERIAL

The invention relates to a method for heat treating fine-grain material, such as raw meal, which is preheated in a preheater by the hot waste gases of a rotary tubular kiln and then finish burnt or calcined in the rotary tubular kiln, additional fuel being added to the material immediately after entrance thereof into the rotary tubular kiln.

In the production of cement, alumina, lime, magnesite, dolomite and the like the heat treatment of the fine-grain material is frequently effected by firstly preheating the material in a preheater with the hot waste gases of a rotary tubular kiln before it is then finished burnt or sintered in the kiln. The major part of the heat work must be performed in the rotary tubular kiln whereas only a minor part of the total heat energy is transferred to the material in the preheater. In view of the higher specific investment costs of the tubular rotary kiln this division of the heat work amongst the rotary tubular kiln are the preheater is not optimal.

To enable the rotary tubular kiln to be given smaller dimensions in cross section and/or length, it has been proposed to provide a preburning zone between the preheater and the rotary tubular kiln and in this zone to preheat the material as much as possible. The particular problem in the design of such a preburning zone is that an extremely uniform supply of the fuel to the material is necessary to avoid overburning of individual material particles (and all the resulting disadvantages, such as caking, agglomeration, etc.).

In a known method this preburning zone is formed by a fluidized bed heated directly by burners from which the material passes into the rotary tubular kiln. Another known method employs a burning chamber with tangential entrance and exit of material and fuel. The disadvantage of these methods resides in the considerable investment costs for the preburning zone which offsets a considerable part of the saving possible on the rotary tubular kiln.

In a further known method a cyclone burning chamber is provided as the preburning chamber and a separate gas stream is supplied thereto by a fan, the waste gases of this cyclone burning chamber being united in a conduit leading from the rotary tubular kiln to the lowermost cyclone of the preheater with the waste gases of the rotary tubular kiln. The material discharged from the second-lowest cyclone of the preheater and the fuel are introduced separately into said cyclone burning chamber. Consequently, in this burning chamber a flame is formed whose heat must be transferred partly by radiation and partly by contact to the individual material particles.

The disadvantage with this known method (apart from the plant expenditure due to the additional use of a cyclone burning chamber and the associated treatment) is primarily the unfavorable heat transfer from the flame produced by the burners in the cyclone burning chamber to the individual material particles, especially since only a quite short time is available for this purpose and a considerable part of the material introduced into the cyclone burning chamber is immediately carried by the gas stream out of the chamber.

Further, a method is known in which additional fuel and fan exhaust air are introduced into the gas conduit which leads from the rotary tubular kiln to the cyclone preheater and into which the material discharge conduit of the second-lowermost cyclone stage opens. Since immediately on entrance into the gas conduit this fuel encounters combustion conditions, the combustion of the fuel takes place largely before the fuel comes into contact with the material. To obtain adequate heat transfer from the combustion gases to the material, it is consequently necessary to make the gas conduit leading to the cyclone preheater relatively long, representing a considerable additional expenditure on plant. In spite of this, it is not possible to avoid with this method a considerable part of the thermal energy contained in the additional fuel leaving the preheater with the exhaust gases, considerably impairing the thermal balance.

A method is also known in which additional fuel is added to the material immediately after its entrance into the rotary tubular kiln. This additional fuel is intended to pass into the gaseous state when it encounters the hot material. The fuel gas thus formed is supplied, together with the kiln waste gases, to a calcining chamber disposed outside the rotary tubular kiln, ignited there and burnt. The aforementioned gasification of the fuel supplied is brought about with the known method inter alia in that in the upper region of the rotary tubular kiln a dam ring retains a considerable amount of material, thus holding available sufficient heat energy for the vaporization of the additional fuel. A disadvantage with this method is also primarily that the thermal energy of the additional fuel is not transferred to the individual material particles directly, but indirectly via a hot gas.

The objective of the invention is thus to obtain a particularly favorable transfer of the heat energy from the additional fuel to the material, both as regards the heat balance and as regards the plant expenditure.

According to the invention, fuel is added to the material for this purpose in such a manner that the combustion of the additional fuel takes place almost completely in the rotary tubular kiln and substantially directly at the material without previous gasification. The fuel is preferably sprayed onto a surface zone of the material just introduced into the rotary tubular kiln which is immediately thereafter covered by material newly introduced into the kiln or already circulated in the kiln. An important point is furthermore that the additional fuel is not too highly preheated or supplied in too fine a distribution, since otherwise gasification of the fuel preceding the combustion must be expected. To achieve the desired combustion of the fuel directly at the material particles without previous gasification it is further advantageous to operate the rotary tubular kiln with an elevated speed of rotation, preferably with a peripheral speed of at least 35m/min.

In this manner it is ensured that the fuel supplied firstly comes into contact only with the material and is mixed therewith substantially homogeneously without any appreciable gasification of the fuel before, on further circulation of the material in the kiln, oxygen is admixed with the fuel and a combustion of the fuel thus takes place directly at the individual material particles.

In this manner, skein formation and local concentrations of the fuel are reliably prevented; under certain conditions, when the fuel is introduced into the preheater, these are difficult to avoid. This also ensures that the fuel does not enter the gas flow immediately and give up its heat energy largely to the latter; the intimate mixing of fuel and material guaranteed with the procedure according to the invention prior to occurrence of the combustion conditions means that the combustion takes place largely directly at the material particles and this guarantees a particularly effective heat transfer.

Moreover, the hot gases forming on combustion of the additionally introduced fuel in the material inlet zone must pass through the entire preheater and thus have the best opportunity of giving up their heat energy to the material to be preheated.

The method according to the invention is thus distinguished by a high specific power (with respect to the dimensions of the plant) and a very favorable heat consumption.

The method according to the invention may be advantageously employed in suspension-type preheaters of various design. It can be used in particular when employing a counterflow shaft preheater provided with a plurality of cross sectional constrictions or when employing a preheater consisting of a plurality of superimposed cyclones and eddy chambers.

There are numerous possibilities as regards the constructional form of an apparatus for carring out the method according to the invention. A convenient embodiment employs for spraying in the solid or liquid fuel a preferably water-cooled lance whose opening is directed substantially perpendicularly onto the material surface in the entrance zone of the rotary tubular kiln and is spaced from such material surface such that the sprayed fuel traverses a distance between about 0.3 and 1.5 m, preferably about 0.4 to 0.8 m from the surface of the material.

Two embodiments of the invention are illustrated in the drawings, wherein.

Figure 1:
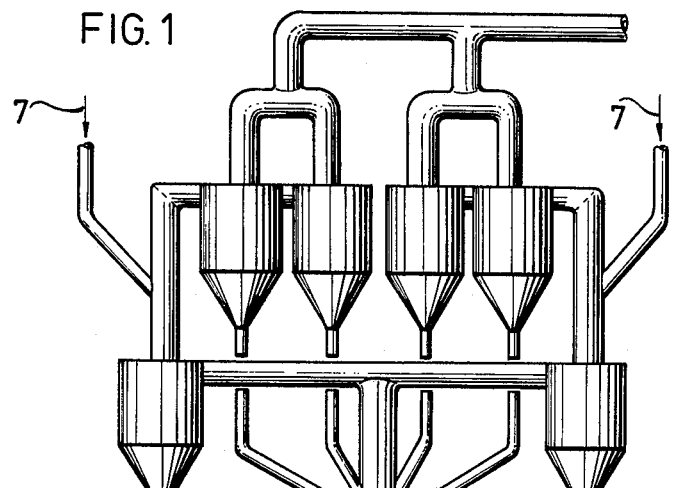
FIG. 1 is a diagrammatic elevational view, partly in section of one embodiment.
Figure 2:
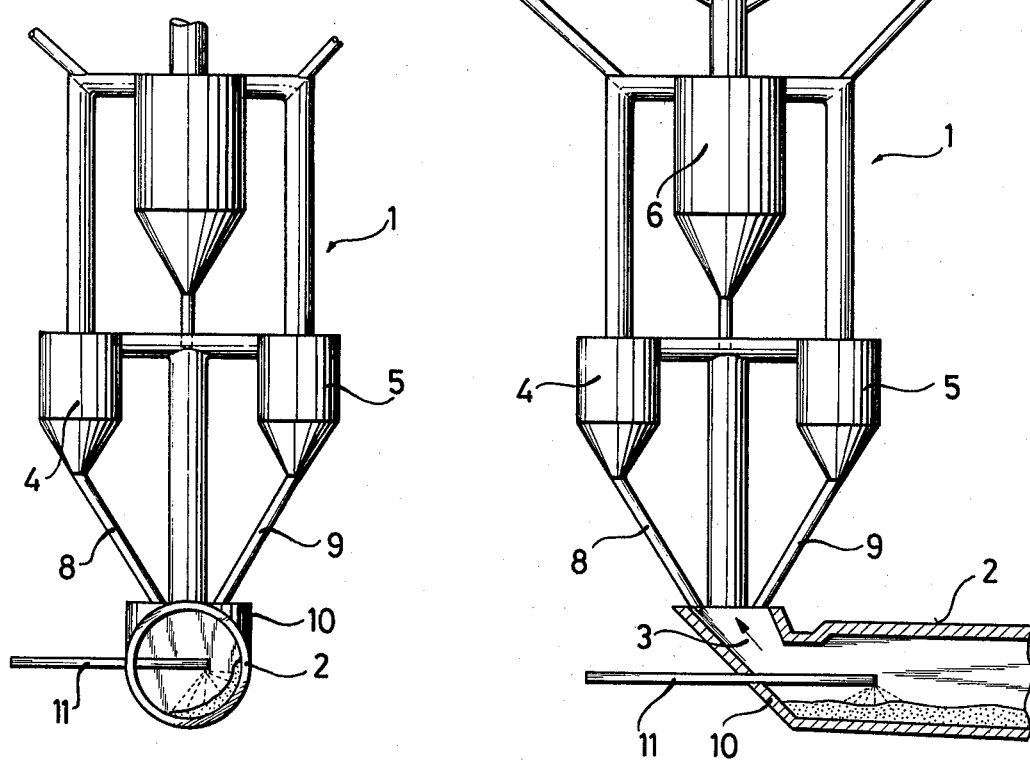
FIG. 2 is a fragmentary end elevational view of the apparatus shown in FIG. 1.

The plant shown in FIGS. 1 and 2 for heat treating fine-grain material, in particular cement raw meal, comprises a preheater 1 and an only partly illustrated rotary tubular kiln which is heated at its right (material discharge end) end (not shown in the drawing). The hot exhaust gases (arrow 3) of the rotary tubular kiln 3 flow through the individual stages of the preheater 1 from the top to the bottom. The preheater 1, the detailed design of which is not of interest here, comprises a plurality of superimposed stages, cyclones, or eddy chambers (e.g. the cyclones 4 and 5 in the lowermost stage, the cyclones 6 in the next higher stage, etc.)

The fine-grain material is introduced at 7 into the preheater 1 and passes through the latter in known manner from the top to the bottom (i.e. substantially in counterflow to the hot waste gases of the rotary tubular kiln which flow through the individual stages of the preheater successively from the bottom to the top). From the lowermost stage of the preheater 1 the preheated material is conducted via the discharge conduits 8 and 9 and the inlet housing 10 to the rotary tubular kiln 2.

According to the invention, a lance 11 projects into the inlet zone of the rotary tubular kiln 2 and solid or liquid fuel is sprayed through the lance onto the surface of the material just introduced into the kiln 2. As shown in particular by FIG. 2, the material particles coming into contact with the fuel introduced through the lance 11 are immediately covered by other material particles thereby providing an excellent uniform mixing of fuel and material. The additional fuel is burned and the hot gases formed on combustion of the additionally introduced fuel leave the kiln 2 together with the remaining waste gases and give up their residual heat content in the preheater 1 to the material to be preheated.

Figure 3:
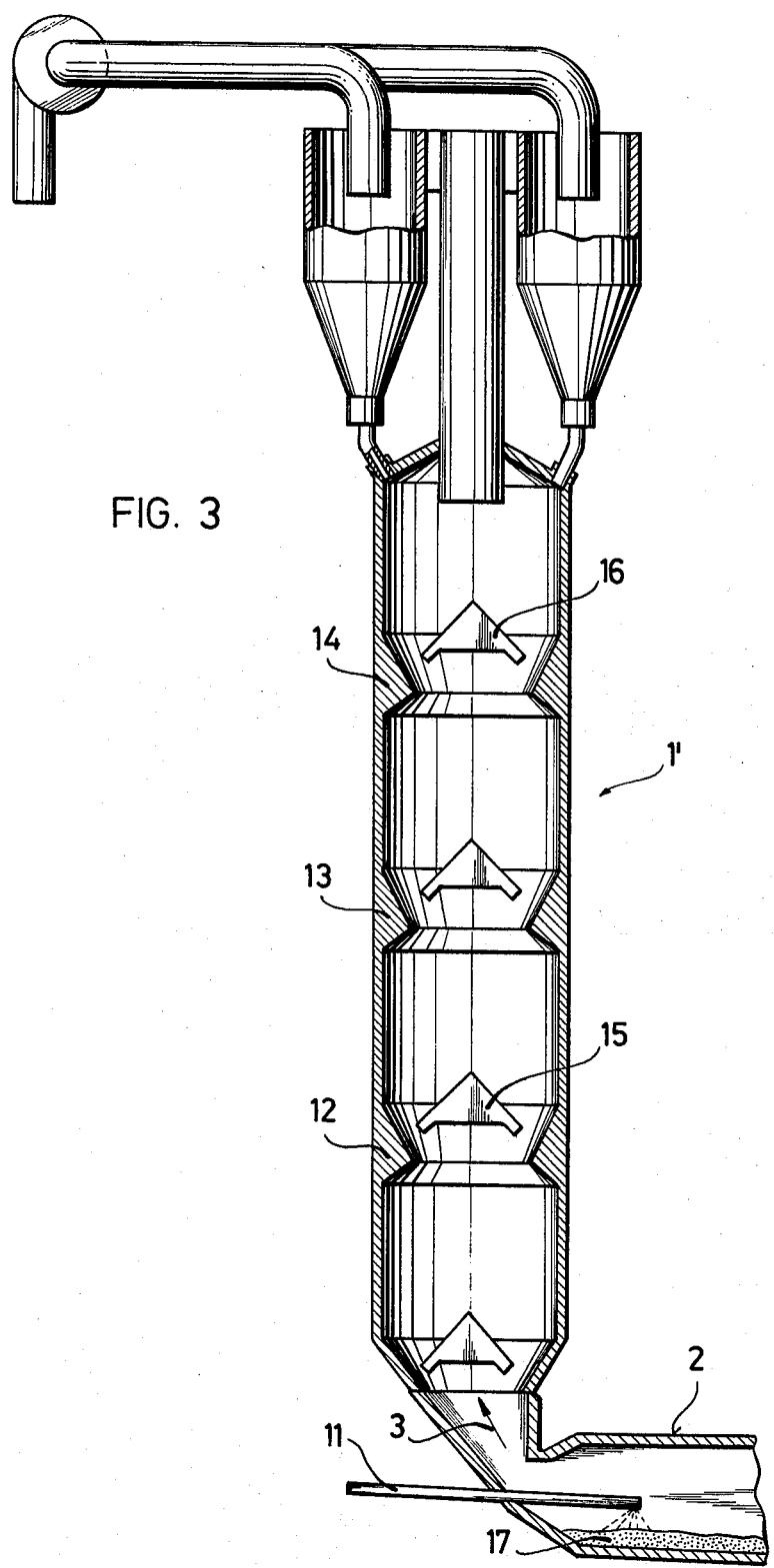
FIG. 3 is a view similar to FIG. 1 of a modified embodiment.

In the embodiment illustrated in FIG. 3 a differently designed preheater 1' precedes the kiln 2. This preheater consists substantially of a vertical shaft having a plurality of cross sectional constrictions 12, 13, 14 over each of which conical deflecting members (e.g. 15, 16) are provided.

The fine-grain material to be heated passes through the preheater 1' from the top to the bottom in counterflow to the waste gases (arrow 3) of the rotary tubular kiln 2.

In this embodiment as well fuel is introduced by means of a lance 11 to the material 17 immediately after the entrance thereof into the rotary tubular kiln 2. Otherwise, however, the actual heating of the kiln 2 is effected at the material discharge side of the kiln (not shown in the drawings) so that the hot gases produced there pass through the kiln 2 in counterflow to the material.

In the region of the material entrance zone of the kiln these waste gases of the latter unite with the hot gases forming by the combustion of the fuel supplied through the lance 11. The entire hot gas flow gives up the major part of its thermal energy to the material to be preheated in the preheater.

We claim:

1. A method for heat treating fine-grain material such as raw cement meal comprising preheating said material; introducing said preheated material to a rotary kiln for subsequent calcining; introducing fuel to said kiln in contact with said preheated material immediately following introduction of said material to said kiln; and combusting said fuel virtually entirely in said kiln and substantially at said material while preventing gasification of said fuel prior to its combustion.

2. The method according to claim 1 wherein said fuel is introduced to said kiln by spraying it onto a surface zone of said material, followed by introducing additional preheated material to said kiln and covering said fuel with said additional material.

3. The method according to claim 1 wherein said fuel is introduced to said kiln by spraying it onto a surface zone of said material, followed by covering said fuel with material previously introduced into said kiln.

4. The method according to claim 1 including rotating said kiln at a peripheral speed of at least 35 m/min.

5. The method according to claim 1 wherein said fuel is introduced to said kiln by spraying it onto said material.

6. The method according to claim 1 wherein said fuel is introduced to said kiln by spraying it onto said material substantially perpendicularly to its surface.

7. The method according to claim 6 wherein said sprayed fuel traverses a distance of between about 0.3 m and 1.5 m, from the surface of said material.

8. The method according to claim 6 wherein said sprayed fuel traverses a distance of between about 0.4 m and 9.8 m, from the surface of said material.

* * * * *